UNITED STATES PATENT OFFICE.

MAX CONRAD, OF ASCHAFFENBURG, AND WALTER BECKH, OF DARMSTADT, GERMANY.

PROCESS OF MAKING 4-IMINO-2-6-DIOXYPYRIMIDIN.

No. 811,826.  Specification of Letters Patent.  Patented Feb. 6, 1906.

Application filed November 3, 1904. Serial No. 231,267.

*To all whom it may concern:*

Be it known that we, MAX CONRAD, professor of chemistry and doctor of philosophy, residing at Aschaffenburg, and WALTER BECKH, doctor of philosophy, residing at Darmstadt, Germany, subjects of the German Emperor, have invented certain new and useful Improvements in the Manufacture of Pyrimidin Derivatives, of which the following is a specification.

This invention has for its object the production of 4-imino-2.6-dioxypyrimidin; and it consists in a process of condensing cyanacetic-acid esters with urea in the presence of condensing agents, such as the alkali alcoholates, the alkali metals themselves, or their amids.

The following equation may serve to illustrate the principal reaction which takes place in the above-characterized condensation:

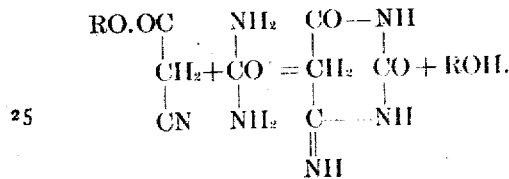

In this equation R is any known alkyl group.

The essential characteristics of the process thus indicated will be seen from what is common to the following specific examples:

Example 1: One hundred and thirteen parts of cyanacetic-acid ethylester are mixed with twenty times the quantity of alcohol in which forty-six parts of sodium have been dissolved. After addition of fifty-eight parts of urea the mixture is boiled several hours in connection with a reflux condenser. The product of reaction is then neutralized, the alcohol is distilled off, the residue is taken up with water, and the 4-imino-2.6-dioxypyrimidin is set free by acetic acid.

Example 2: Twenty parts of dry urea are intimately mixed with the like quantity of sodium amid and twenty parts of xylol are poured over it. Then with proper external refrigeration 17.5 parts of cyanacetic-acid methylester are caused to flow upon this. After the principal reaction is over the product of reaction is heated several hours to about 100° to 120° centigrade. The vesicular dry melt is then taken up in water with careful avoidance of too great heating. After the xylol is removed in a suitable manner the 4-imino-2.6-dioxypyrimidin is precipitated out of the solution of its sodium salt by the addition of acetic acid or in another suitable way.

The process proceeds in an analogous manner for the production of 4-imino-2.6-dioxypyrimidin by condensing urea with other cyanacetic-acid esters in the presence of alkali condensing agents.

Having now described our invention and in what manner the same is to be performed, what we claim as new, and desire to secure by Letters Patent, is—

1. The process of producing 4-imino-2.6-dioxypyrimidin, which process consists in condensing urea and cyanacetic-acid ester in the presence of an alkali condensing agent, substantially as described.

2. The process of producing 4-imino-2.6-dioxypyrimidin, which process consists in condensing urea and cyanacetic-acid ethyl ester in the presence of an alkali condensing agent, substantially as described.

MAX CONRAD.
WALTER BECKH.

Witnesses:
 OTTO WOLFES,
 WALTER HOUSING.